(12) United States Patent
Numata

(10) Patent No.: US 8,495,191 B2
(45) Date of Patent: Jul. 23, 2013

(54) MANAGEMENT APPARATUS AND MANAGEMENT METHOD

(75) Inventor: Masahito Numata, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 440 days.

(21) Appl. No.: 12/437,297

(22) Filed: May 7, 2009

(65) Prior Publication Data
US 2009/0282117 A1  Nov. 12, 2009

(30) Foreign Application Priority Data
May 9, 2008 (JP) .................................. 2008-123284

(51) Int. Cl.
G06F 15/173 (2006.01)
(52) U.S. Cl.
USPC ............................ 709/223; 358/403; 358/404
(58) Field of Classification Search
USPC .................................................. 358/403, 404
See application file for complete search history.

(56) References Cited

U.S. PATENT DOCUMENTS

| 5,719,924 A | * | 2/1998 | Haneda et al. ............ 379/100.03 |
| 2005/0257275 A1 | * | 11/2005 | Ooba .............................. 726/28 |
| 2008/0098038 A1 | * | 4/2008 | Motoyama .................... 707/200 |

FOREIGN PATENT DOCUMENTS

| JP | H11-122416 A | 4/1999 |
| JP | 2006-251929 A | 9/2006 |

* cited by examiner

*Primary Examiner* — Duyen Doan
(74) *Attorney, Agent, or Firm* — Carter, DeLuca, Farrell & Schmidt LLP

(57) ABSTRACT

A destination table is updated on the basis of the use record of destination information in adaptation to the environment of a user. A device management server collects a destination table managed by each device from a device on a network. Then, the device management server checks the use record of the destination table collected from each image forming device, and determines a candidate to be deleted. Then, the device management server does not delete the destination table determined to be a deletion candidate when a number of times operations have been performed by the image forming device in a predetermined period is less than a threshold value. The device management server deletes the destination table of the determined candidate when the number of times operations have been performed by the image forming device in the predetermined period is greater than or equal to the threshold value.

9 Claims, 11 Drawing Sheets

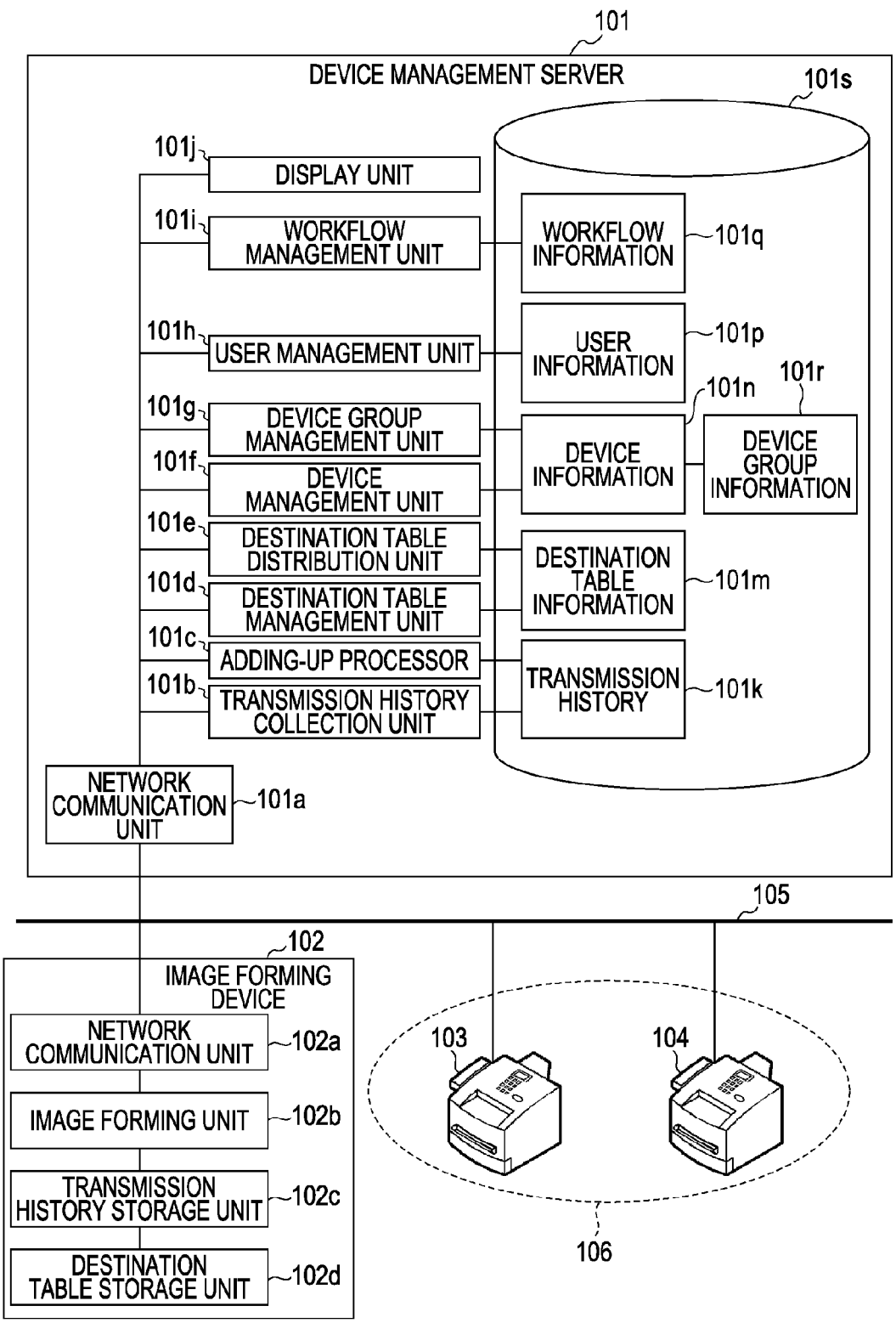

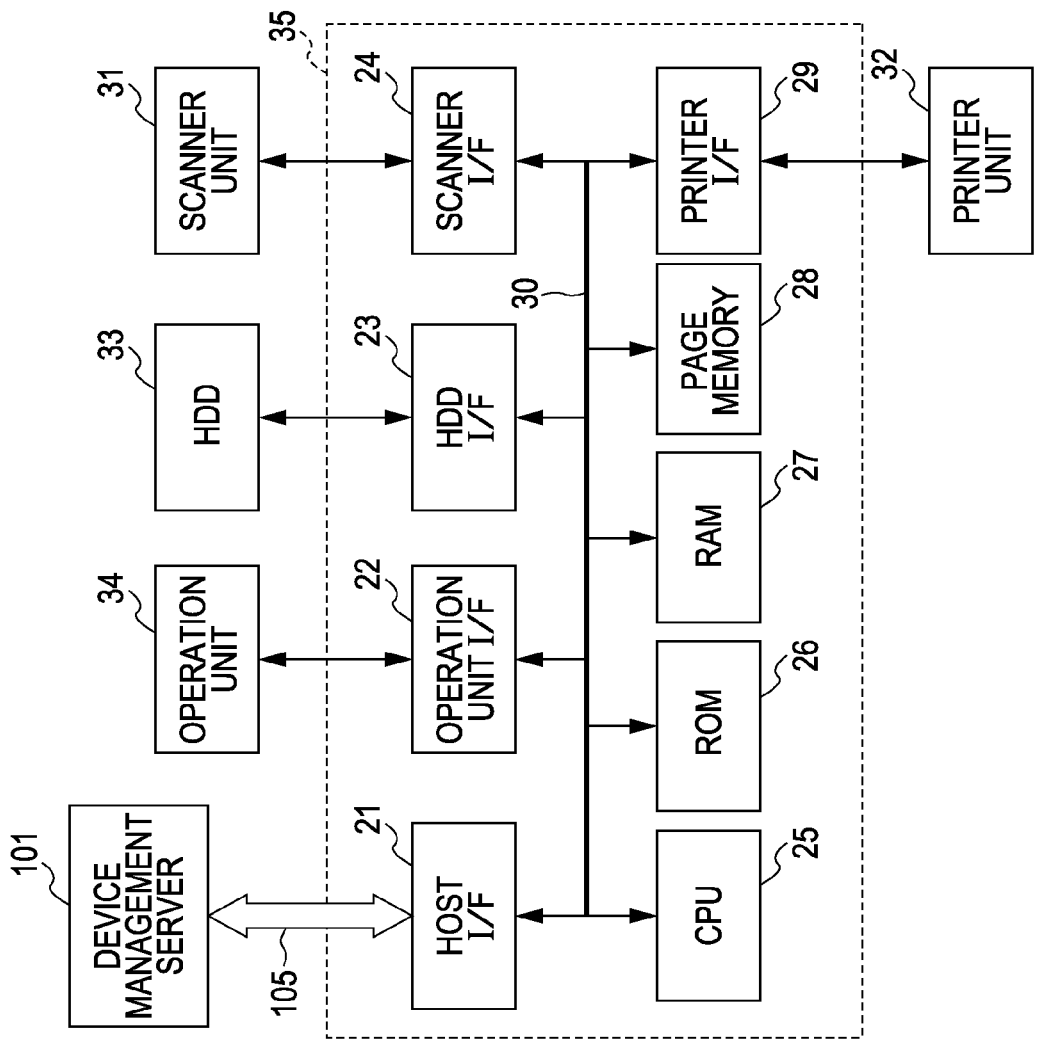

FIG. 3

| | DESTINATION TABLE UPDATE SETTING | | |
|---|---|---|---|
| | Selection of Update Target | | |
| 301 | Type: Device / Device Group | | |
| | Selection of Device: | | |
| | Device Name | Assigned Device Group | IP Address |
| 302 ☑ | Device A | OA Corner at 2nd Floor | 172.24.XX.XXX |
| ☐ | Device B | OA Corner at 2nd Floor | 172.24.XXX.XXX |
| ☐ | Device C | Reception | 172.24.XXX.XXX |
| ☐ | Device D | Meeting Room A | 172.24.XXX.XXX |
| ☐ | Device E | Meeting Room B | 172.24.XXX.XXX |

303 — Next    Cancel

FIG. 4

DESTINATION TABLE UPDATE SETTING

Destination Table Update Condition Setting
- 401 — ◉ Use record of added-up result is [5] or more times
- ○ Use record of added-up result is [1] % or more of whole transmission history
- ○ Use record of in one of plural added-up results is [5] or more times
  - ◉ Device adding-up and device group adding-up

Exception condition setting
- 402 — ☑ Not to be deleted when number of times of use of print/copy is less than [1000] times during the period
- ☑ Not to be deleted when destinations that do not meet condition in added-up result in plural periods is less than [2] continuous times
- ☑ Destination information used by workflow management is not deleted
- ☑ Destination information of important destination table is not deleted
  - ☐ Exclude from important destination table 403 — ☑ Mail deleted address information to user who used a deleted destination in the past 404 — [ Next ]   [ Return ]

FIG. 6

From : DeviceManager@○○○.com
To : userA@△△△.com
Subject : The destination is deleted.

Has been transmitted to a user who used the destination described below.
The destination described below is deleted because the use record thereof is small.

Target Device : Device A
Deleted Destination : userF@XXX.com
Adding-up Period : 10/1/2007 TO 11/1/2007
Actual Use : 2

FIG. 7

DESTINATION TABLE UPDATE CONDITION SETTING

Adding-up Setting

701
◉ Newly create a added-up result

701a Adding-up Start Day

| Year | 2007 |
| Month | 10 |
| Day | 1 |

701b Adding-up Period 1 month 1 year
6 months
3 months
1 week
1 day

701c Adding-up Unit

Device
Device Group

Selection of Adding-up Device: 701d

|  | Device Name | Assigned Device Group | IP Address |
|---|---|---|---|
| ☑ | Device A | OA Corner at 2nd Floor | 172.24.XX.XXX |
| ☐ | Device B | OA Corner at 2nd Floor | 172.24.XXX.XXX |
| ☐ | Device C | Reception | 172.24.XXX.XXX |
| ☐ | Device D | Meeting Room A | 172.24.XXX.XXX |
| ☐ | Device E | Meeting Room B | 172.24.XXX.XXX |

○ Specify from Existing Added-up Result

702

|  | Adding-up Start Day | Adding-up Period | Adding-up Unit | Selection Device |
|---|---|---|---|---|
| ☑ | 6/1/2007 | 1 month | Device | Device A |
| ☐ | 7/1/2007 | 1 month | Device | Device A |
| ☐ | 8/1/2007 | 1 week | Device | Device B |
| ☐ | 7/1/2007 | 1 month | Device Group | OA Corner at 2nd Floor |

703 [ Execute ]  [ Return ]

FIG. 9

| STORAGE MEDIUM, SUCH AS FD/CD-ROM |
|---|
| DIRECTORY INFORMATION |
| FIRST PROCESSING PROGRAM<br>PROGRAM CODE GROUP CORRESPONDING TO STEPS OF<br>FLOWCHART SHOWN IN FIG. 8 |
|  |

MANAGEMENT APPARATUS AND MANAGEMENT METHOD

BACKGROUND OF THE INVENTION

1. Field of the Invention

The present invention relates to a management apparatus for obtaining history information that is collected from a plurality of devices and managing destination information.

2. Description of the Related Art

In general, multi-function copiers include functions, such as a copy function, a printer function, a facsimile transmission function, a scan function, a scanned image transmission function, and an electronic mail transmission function. Furthermore, these types of multi-function copiers are called MFPs (Multi-Function Peripherals) and have been widely put to practical use. In MFPs, it is possible to register facsimile numbers, electronic mail addresses, the address of a network client, and the like as destination information of the transmission destination for a transmission function process in a destination table in devices.

However, in apparatuses, such as MFPs, which are used by an unspecified large number of users, there is a problem in that as a result of destination information being freely registered by each user, the destination table increases in size, and thus memory resources cannot be effectively utilized.

Furthermore, because an unspecified large number of users use an MFP, there is another problem in that destination information that is no longer used in practice is kept in the memory resources of the MFP.

In comparison, there is a known technology in which the number of transmissions and receptions is stored in advance in a memory in an MFP when mail is transmitted or received, and when a predetermined threshold value is exceeded, the address information is automatically registered in an address book (see, for example, Japanese Patent Laid-Open No. 2006-251929).

Furthermore, when the available size of memory resources for storing the destination table is decreased, the address is automatically deleted on the basis of the number of transmissions stored for each transmission destination and the up-to-date transmission day (see, for example, Japanese Patent Laid-Open No. 11-122416).

However, in Japanese Patent Laid-Open No. 2006-251929 described above, there is no description regarding deletions. As a consequence, in an apparatus, such as an MFP, which is used by an unspecified large number of users, it is not possible to prevent the destination table from increasing in size.

Furthermore, in Japanese Patent Laid-Open No. 11-122416 described above, since there is only one reference with which the destination table is deleted, it is not possible to delete the destination table in such a manner as to deal with various environments of the user. For example, destination information that is always used only in January every year is deleted for the reason that the most recent transmission date and time is old in Japanese Patent Laid-Open No. 11-122416.

SUMMARY OF THE INVENTION

The present invention to provide a scheme for updating a destination table on the basis of the use record of destination information, which can be adapted to the environment of a user.

A management apparatus according to the present invention has the following feature configuration.

The present invention provides a management apparatus for managing destination information stored in an image forming device, the management apparatus including: a determination unit configured to determine the destination information of a deletion candidate on the basis of a use record of the destination information stored in the image forming device in a predetermined period; and a deletion unit configured not to delete the destination information of the deletion candidate determined by the determination unit when the number of times operations have been performed by the image forming device in a predetermined period is less than a threshold value and configured to delete the destination information of the deletion candidate determined by the determination unit when the number of times operations have been performed by the image forming device in the predetermined period is greater than or equal to the threshold value.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A shows an example of a device management system according to an embodiment of the present invention.

FIG. 1C is a block diagram illustrating the hardware configuration of an image forming device shown in FIG. 1A.

FIG. 3 shows an example of a user interface displayed on a display unit of the device management server shown in FIG. 1A.

FIG. 4 shows an example of a user interface displayed on the display unit of the device management server shown in FIG. 1A.

FIG. 6 shows an example of a mail notified by a network communication unit shown in FIG. 1A.

FIG. 7 shows an example of a user interface in the device management system according to the present embodiment.

FIG. 9 illustrates a memory map of a computer-readable storage medium on which various kinds of data processing programs that can be read by the management apparatus according to the present invention are stored.

DESCRIPTION OF THE EMBODIMENTS

Figure 1B:
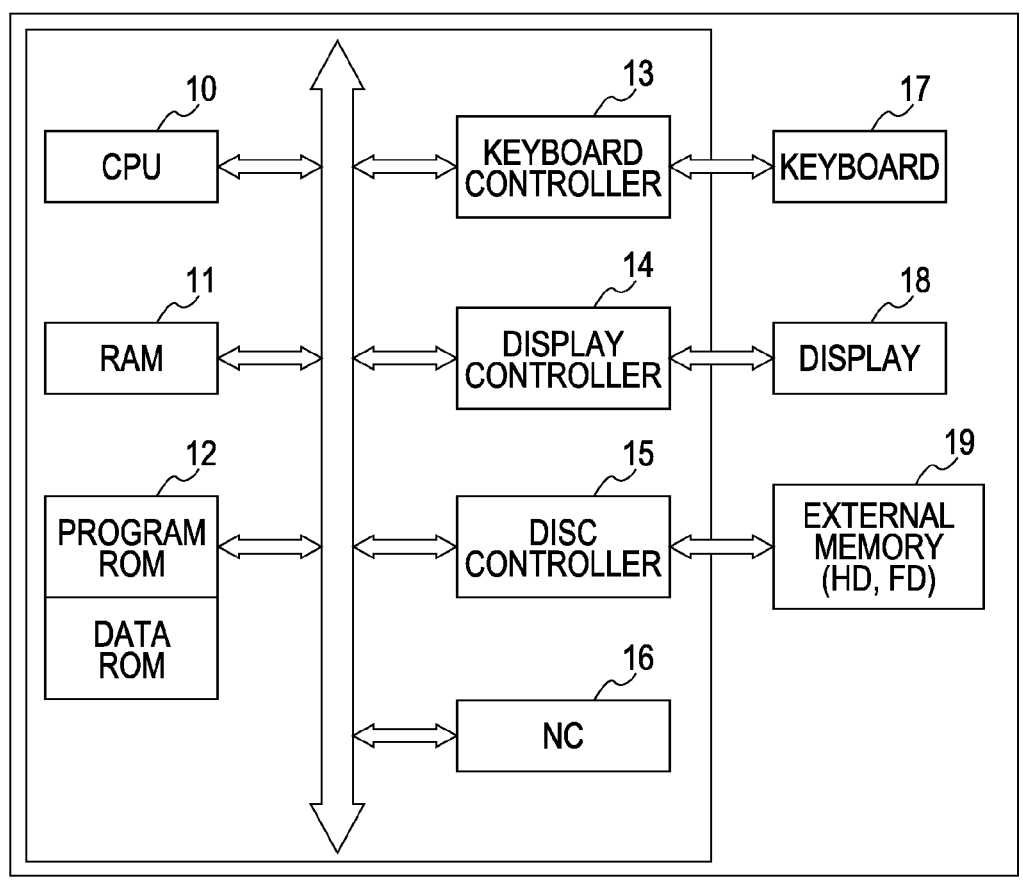
FIG. 1B is a block diagram illustrating an example of the configuration of the hardware of a device management server 101 shown in FIG. 1A.

Embodiments of the present invention will be described below with reference to the drawings.

Description of System Configuration

FIG. 1A shows an example of a device management system according to the present embodiment. The present example is a system example in which device information that is obtained from devices, such as a plurality of image forming devices, via a network communication unit 101*a* and a network 105, and that is obtained by a device management server 101 is stored in a database 101*s* and managed.

Here, examples of the image forming device include the above-described MFP, a facsimile apparatus, and a printer having a mail transmission function and a file transmission function. The device management server 101 can be configured by an ordinary information processing device (personal computer, etc.).

The device management server 101 includes a display unit 101j, a workflow management unit 101i, a user management unit 101h, a device group management unit 101g, a device management unit 101f, a destination table distribution unit 101e, a destination table management unit 101d, an adding-up processor 101c, and a transmission history collection unit 101b.

Each device includes means equivalent to a network communication unit 102a, an image forming unit 102b, a transmission history storage unit 102c, and a destination table storage unit 102d provided in a device 102. The transmission function of each device has, for example, a facsimile transmission function, and a transmission function in compliance with a protocol used in a predetermined operating system (OS).

Here, examples of the protocol include an SMB (Server Message Block), and FTP (File Transfer Protocol) used when a file is transferred via a TCP/IP network, such as the Internet or an intranet. In the present embodiment, the transmission function is not limited to these protocols. Therefore, transmission using "SEND" in accordance with an SMTP command from the device is also managed as a transmission history.

In the present system, a case is shown in which devices connected to the network 105 are managed by the device management server 101. The system may also be formed in such a way that devices connected to another network are managed via a communication terminal, such as a router.

In FIG. 1A, in the present device management system, the device management server 101 and a plurality of devices 102, 103, and 104 having a destination table registration function are connected with one another via the network 105.

In the present embodiment, the network 105 may be a LAN, a wireless LAN, or the Internet. Furthermore, in the present embodiment, the devices 103 and 104 can also be managed as a device group 106 on the basis of location information indicating an installation place, such as, for example, "OA corner at second floor".

It is possible for the device management server 101 to manage device information 101n and device group information 101r of devices connected to the network 105 in the device management unit 101f. Furthermore, it is also possible to manage the device management server 101 as a device group by the device group management unit 101g.

Furthermore, it is possible for the transmission history collection unit 101b to collect a transmission history from the transmission history storage unit 102c of a device to be managed. Also, it is possible for the adding-up processor 101c to add up how much a collected transmission history 101k has been used for each destination information. Here, there is a case in which the transmission history collection unit 101b is configured as, for example, a collection plug-in module. In this case, the transmission history collection unit is formed in such a way that a module that communicates with a corresponding collection plug-in module is installed in each device.

In the destination table management unit 101d, destination information can be stored in the database 101s and managed for each device and device group and furthermore, the destination table distribution unit 101e can distribute a destination table to the device.

In the user management unit 101h, user information 101p of users who use devices can be managed. In the workflow management unit 101i, it is possible to manage routine operations in devices as workflow information 101q.

It is described in the present embodiment that one device management server has the above-described functions. In addition, the configuration in which the above-described functions are distributed to another server falls under another embodiment.

When a general user performs mail transmission or facsimile transmission, the device 102 stores the transmission history in the transmission history storage unit 102c. Furthermore, examples of a method for registering destination information in the destination table storage unit 102d include a method of making a direct registration by a general user, a method of performing distribution from the destination table distribution unit 101e of the device management server 101, and a method of importing a file in which destination information is described.

In the following, a description will be given of an outline of a device management process in a device management system including the above-described components.

The device management server 101 collects a transmission history from the transmission history storage unit 102c of the device 102 and stores the transmission history as a transmission history 101k. Next, a management user who manages the device uses the adding-up processor 101c to add up the transmission history 101k with regard to the device for which the destination table is desired to be updated, and adds up the use record for each destination information.

Furthermore, destination table updating conditions for updating the destination table are set, and destination table information 101m is updated on the basis of the added-up results and the updating conditions. Finally, by distributing the destination information updated in the destination table distribution unit 101e to the device, the information in the destination table storage unit 102d of the device is updated.

FIG. 1B is a block diagram showing an example of the configuration of the hardware of the device management server 101 shown in FIG. 1A. The device management server 101 is configured to include hardware resources of an ordinary PC.

In FIG. 1B, a CPU 10 executes programs, such as an OS and application programs, which are stored in a program ROM of a ROM 12 or loaded into a RAM 11 from an external memory 19. Here, the OS is an abbreviated word of an operating system that runs on a computer. Hereinafter, the operating system will be referred to as an OS. The processing of each of the flowcharts (to be described later) can be implemented by the execution of these programs.

The RAM 11 functions as a main memory, a work area or the like of the CPU 10. A keyboard controller 13 controls key input from a keyboard 17 and a pointing device (not shown). A display controller 14 controls the display of various kinds of display devices 18. A disc controller 15 controls data access in the external memory 19, such as a hard disk (HD) or in a floppy (registered trademark) disk (FD), in which various kinds of data are stored. A network controller (NC) 16 is connected to a network, so that a communication control process with other devices connected to the network is performed. The external memory 19 is configured in such a manner that a storage area that implements the database 101s shown in FIG. 1A can be allocated.

The CPU 10 executes control programs that function as a workflow management unit 101i, a user management unit 101h, a device group management unit 101g, a device management unit 101f, a destination table distribution unit 101e, a destination table management unit 101*d*, an adding-up processor 101*c*, and a transmission history collection unit 101*b*, thereby performing various kinds of management processes shown in FIG. 1A.

FIG. 1C is a block diagram showing the hardware configuration of an image forming device shown in FIG. 1A. In this example, in FIG. 1C showing the case of an MFP (Multi Function Peripheral) as an image forming device, the device management server 101 is connected in such a manner as to be capable of communicating with the network 105.

Here, for the network 105, a network cable, a wireless LAN device, and the like can be used.

An operation unit 34 is formed of an image display unit and a key input unit, and receives operation instructions from the user. The operation unit 34 has a function of displaying information on the image processing device to the user.

An HDD 33 is used to store data to be input/output and images. A scanner unit 31 optically reads an image of a document placed on a document holder (not shown). A controller unit 35 performs control of the image processing device. A printer unit 32 prints and outputs an image formed by the image processing device on a recording medium.

Next, the configuration of a controller unit 35 will be described.

In the controller unit 35, a host I/F 21 is a data interface with the device management server 101, and is formed of a connector and a data buffer.

An operation unit I/F 22 is an interface through which key information input via the operation unit 34, and information to be presented to the user are input and output. The operation unit I/F 22 is formed of a connector and a data buffer.

An HDD I/F 23 is an interface with the HDD 33, and is formed of a connector and a data buffer. A scanner I/F 24 is an interface for image information read by the scanner unit 31, and is formed of a connector and a data buffer.

The HDD 33 has a program area and a data area. In the data area, information on the user and job information are stored. In the program area, programs based on control procedures shown in flowcharts (to be described later), which are executed by a CPU 25, are stored.

The CPU 25 is connected to other blocks via a bus 30, and transfers data and commands among the blocks so as to control the present image processing device.

In a ROM 26, programs to be executed by the CPU 25, and data such as character fonts, are stored.

A RAM 27 is a work area for temporarily storing various kinds of data and images, in which various kinds of computations are performed. A page memory 28 is a memory in which an image to be input or output can be directly developed in a bit map. A printer I/F 29 is an interface for information on images to be printed by the printer unit 32, and is formed of a connector and a data buffer.

Figure 2:
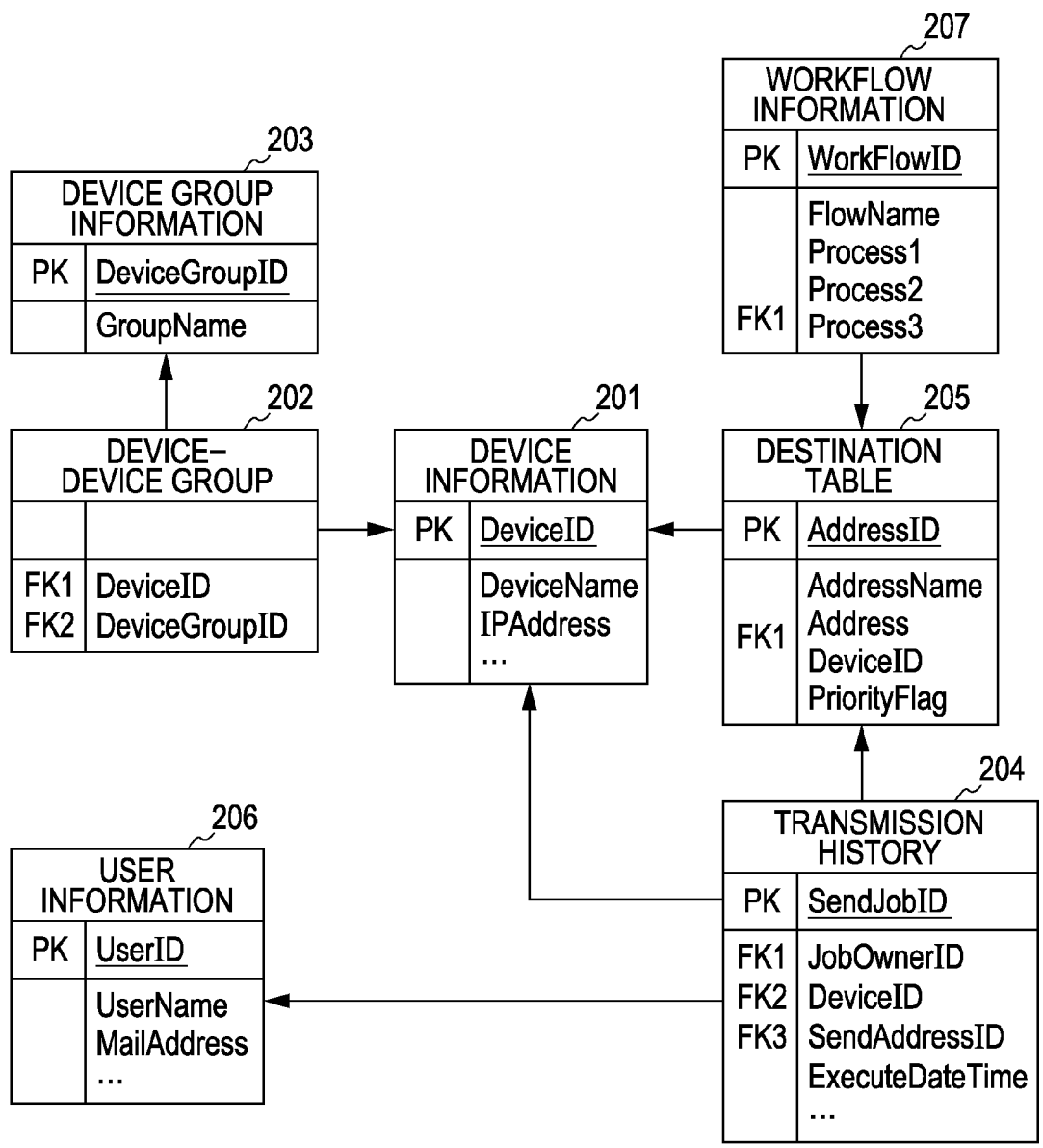
FIG. 2 illustrates a table structure in a database of the device management server shown in FIG. 1A.

FIG. 2 illustrates a table structure within the database 101*s* of the device management server 101 shown in FIG. 1A.

In FIG. 2, arrows and FKs represent external reference keys, which means that data pointed by an arrow is referred to. A device information table 201 shown in the figure is referred to by a destination table 205, a transmission history table 204, and a device-device group table 202. A user information table 206 is referred to by the transmission history table 204. A device group information table 203 is referred to by the device-device group table 202. A workflow information table 207 is referred to by the destination table 205.

For example, when viewed from the relation between the transmission history table 204 and the device information table 201, the device information in the transmission history information is not stored in the transmission history table, but is stored in the device information table 201, and the data is referred to. By forming such a table structure, it is possible to refer to the same data in plural functions in the device management server 101, making it possible to perform coordination among the functions.

The table structure shown in FIG. 2 is only an example for implementing the present embodiment and is not limited to this table structure. Of course, the table structure may be implemented by another table structure.

Figure 5:
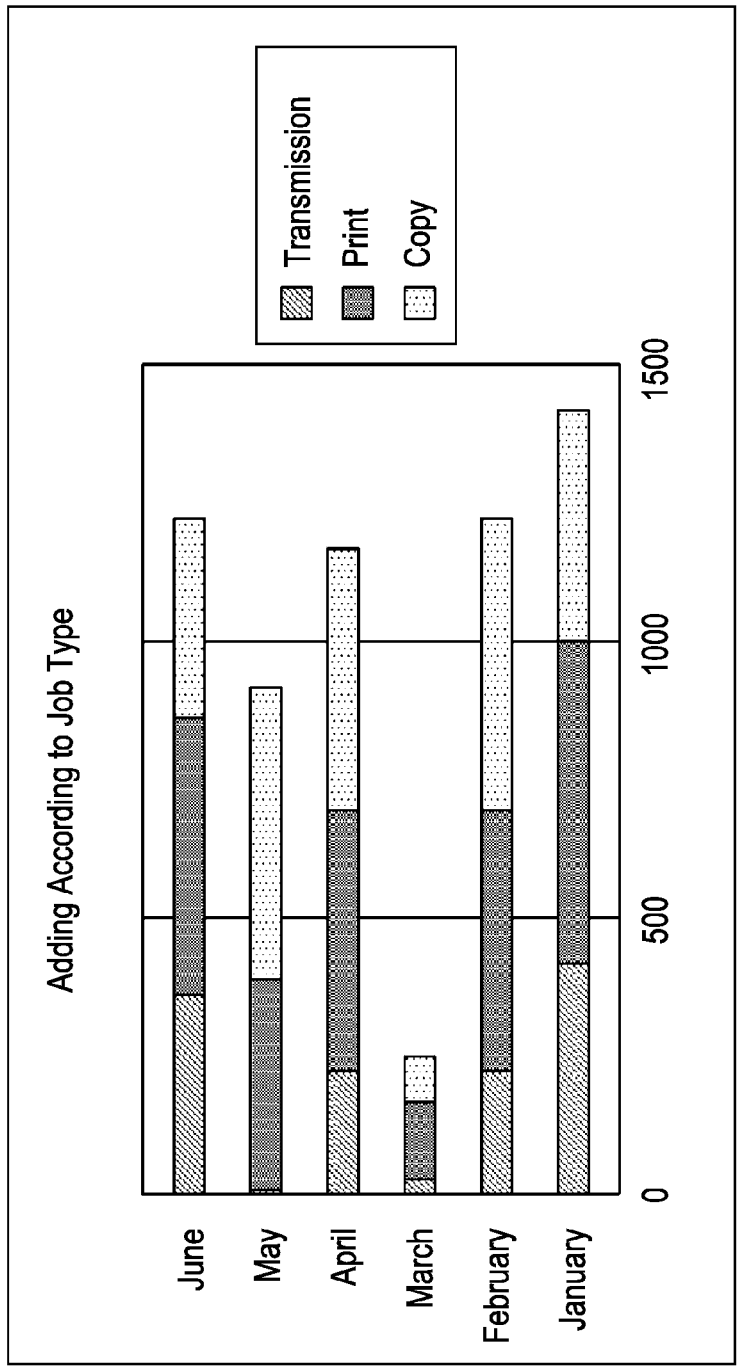
FIG. 5 shows an example of a user interface displayed on the display unit of the device management server shown in FIG. 1.

FIGS. 3 to 5 show examples of user interfaces displayed on the display unit 101*j* of the device management server 101 shown in FIG. 1A. FIG. 3 shows an example of a screen used to select a device for which the destination table is updated when a management user selects a device whose destination table is to be updated. FIG. 4 shows an example of a destination table updating condition setting screen displayed on the display unit 101*j* of the device management server 101 when the management user sets updating conditions for updating the destination table. The destination table updating condition setting screen is displayed when a next button 303 (to be described later) is pressed on the screen shown in FIG. 3.

In FIG. 3, an updating type selector 301 is used to select a unit at which the destination table is updated. In the present embodiment, a selection can be made from the device and the device group. A configuration in which a user and a user group can be selected in a system in which destination tables are managed for each user and user group falls under another embodiment.

An updating target selector 302 is used to select a device and a device group whose destination tables are updated. It is possible for the user to select a device or a device group by putting a check in a check box. In the present embodiment, the screen is changed in accordance with the content of the updating type selector 301, and the screen when a device is selected for the updating type is shown in FIG. 3.

In the present embodiment, since the updating target of the destination table can be selected from an arbitrary device and device group, it is possible to update a destination table in an optimum unit on the basis of the environment of the user.

For example, in a case where the user is in an unspecified device environment, it is possible to update the destination table to an optimum destination table in each device by performing updating for each device.

On the other hand, in the case of a system environment in which devices are collectively placed in an OA corner and the user uses an available device in the OA corner, it is possible to update the destination table to an optimum destination table for the device in the OA corner by updating the destination table in the device group (OA corner).

In the state of the user interface shown in FIG. 3, when the user operates the pointing device so as to press the next button 303, the display screen shifts to a screen, shown in FIG. 4, through which updating conditions are specified.

In FIG. 4, an updating condition setting unit 401 is configured in such a manner that the setting of the updating conditions of the destination table can be performed by selecting the destination table updating condition using a radio button. In the present embodiment, three updating conditions, for example, "The use record of the added-up result is N or more times", "The use record of the added-up result is N % or more", and "The use record in one of plural added-up results is N or more times", are provided. At this point, by operating the pointing device so as to select one of the corresponding radio buttons by the user, the updating condition of the destination table can be set.

For the use record, a numerical value can be input in a place corresponding to "N". The updating conditions set herein are referred to by the destination table management unit 101d in a procedure shown in FIG. 8 (to be described later). In the present embodiment, for each image forming device, the updating conditions selected by the manager via the user interface shown in FIG. 4 are assumed to be stored in the database 101s. The above-described "N" indicates a numerical value greater than or equal to the specified number of times or greater than or equal to the specified ratio, and can be set in a pre-set range by the manager.

In "The use record of the added-up result is N or more times", it is possible to delete destination information with a small use record among the added-up results. In "The use record of the added-up result is N % or more of the entire transmission history", by making the reference be a ratio, there is an advantage that when the total number of transmissions is small due to, for example, a suspension of work, the destination information is not contained in the deletion target.

In "The use record is N or more times in one of plural added-up results", the updating reference can be determined from a plurality of perspectives. For example, in a case where it is desired to update the destination table of one device in the above-described example in which devices are placed in an OA corner, it is possible to determine the use record of the destination table on the basis of the added-up result of the device and the added-up result of the device group.

Furthermore, by selecting these destination table updating conditions, it is possible to set updating conditions preferred by the user in adaptation to the environment of the user.

An exception condition setting unit 402 is used to set conditions under which even the destination information that does not meet the updating conditions is not deleted exceptionally. In the present embodiment, five exceptional conditions can be selected. However, the exceptional conditions are not limited to these five conditions.

Here, "Not to be deleted when the use record (indicating the image forming process history) of print/copy is less than N times during the period" refers to a condition under which, when the use record of another job is small, the destination information is not deleted in a case where the updating conditions are not satisfied. Here, the number of print processes or the number of copy processes may be compared with a specified threshold value (N times), or the total of the number of print processes and the number of copy processes may be compared with the specified threshold value (N times).

More specifically, it is possible to determine, from the use record of another job, a case in which the device management server 101 has a function of obtaining a job history (a print history, a copy history, etc.) other than the transmission history, and the updating conditions are not accidentally satisfied due to a holiday or a failure of the device, as shown in the history of March of added-up result (FIG. 5) according to the job type on the added-up result specification screen shown in FIG. 7 (to be described later). This example shows an example in which, as job types, a transmission job, a print job, and a copy job are added up.

Here, the type of another job is not limited to a print and a copy, and may be a job, such as a scan or FAX reception.

Furthermore, the construction may be formed in such a manner as to be capable of selecting the type of another target job.

In the exception condition setting unit 402 shown in FIG. 4, "Not to be deleted when the destination information that does not meet condition in added-up results in plural periods is less than N continuous times (less than the specified number of times)" refers to a condition under which because the destination information in which the use record was small accidentally is not deleted, the destination information having a use record in another adding-up period is not deleted.

Furthermore, in the exception condition setting unit 402 shown in FIG. 4, "Destination information used by workflow management is not deleted" refers to that the destination used by workflow management, which is another function in the device management server, is not deleted, and is an important exception condition in coordination among the functions. Here, the workflow management is a function of managing routine operations of the user in the device as a workflow. More specifically, a routine operation group of (user authentication→scan→copy→mail scanned image to fixed destination) is set in advance in the device so as to improve the ease of use of the user. Such destination information used by an application in the device can be set so as not to be deleted exceptionally.

The destination information is made to be a condition of not being deleted, including a case in which the destination information meets the destination updating condition of the specified number of times or more in the added-up result in another period.

In the above-described example, when the destination information of the routine operation, which is finally used, is deleted by the destination table updating, this exerts an influence on the function of managing the workflow. Therefore, the destination information is a condition of not being deleted exceptionally. Three examples of a specific implementation method will be given.

A first method is as follows. In the table structure diagram shown in FIG. 2, the destination table 205 is searched for information on the destination information to be deleted, and it is confirmed whether the destination information is externally referred to from the workflow information table 207. Here, in a case where the destination information is externally referred to, since it is destination information used by workflow management, the destination table management unit 101d determines that the destination information meets this exception condition.

In a second method, when the device stores the transmission history, information on the application that used the destination information is kept like "the destination information used by workflow management".

When the device management server 101 collects the transmission history from the device, it is possible to keep the information on the application that used the destination information as well in the transmission history stored by the server.

Then, for updating the destination table, the information on the destination to be deleted is compared with the application that used the destination information in the transmission history, and the destination table management unit 101d determines that the destination information used by the workflow management meets this exception condition.

In the second method, in addition to the workflow information managed by the device management server 101, workflow information that is directly registered in the device by a general user can also be included in the determination.

In a third method, workflow management has a function of obtaining workflow information registered in the device via a network. The destination table management unit 101d confirms whether the destination information to be deleted has been registered in the device as a workflow by using the function.

In the third method, it is possible to cause the workflow registered in the device by the general user to be included in the determination. Furthermore, unlike the second method, a case in which the destination information is unused and is not kept in the transmission history can be included in the determination.

In the present embodiment, the other function of using the destination table is set as workflow management, but is not limited to this.

In the exception condition setting unit 402 shown in FIG. 4, "The destination information in the important destination table is not deleted" refers to an exception condition under which important destination information like, for example, the destination information registered by the device manager, is not deleted. Examples of a method for managing important destination information include a method of attaching a priority for each destination information, and a method of creating an important destination folder in the destination table and attaching importance to the destination information therein. Here, when "The destination information in the important destination table is not deleted" in the exception condition setting unit 402 is selected, as will be described later, the destination table management unit 101d performs an important destination information excluding process.

With this function, it is possible for the destination table management unit 101d to update the destination table by considering the priority of the destination information rather than performing an automatic update by using only the use record as a reference.

In the exception condition setting unit 402 shown in FIG. 4, "Exclude from the important destination table" refers to a function of excluding, from the important destination table, the destination information that has been excluded from the deletion target by considering that the destination information is important even if the use record is small in the above exception condition. With this function, the destination table management unit 101d does not immediately delete the important destination information, but can gradually lower the priority in order to prevent the destination table from increasing in size.

The mail notification setting unit 403 checks a check box when it is set that the fact that the destination information has been deleted from the device is to be notified to the user having a use record of using the deleted destination information in the past. Here, what is important is that the destination information is notified to the user who used the deleted destination information in the past rather than the destination information is notified to the deleted destination information.

In the present embodiment, since the past transmission history is stored in the database 101s, it is possible for the device management server 101 to notify the user who used the deleted destination information in the past.

As an example of a specific implementation method, in the table structure shown in FIG. 2, the destination table 205 is searched for the destination information to be deleted, and a search for the transmission history of the transmission history table 204 that makes an external reference to the destination information is made.

Next, the user information table 206 is searched for user information that is referred to as an execution user of the applicable transmission history, and the fact that the destination information has been deleted from the device is notified to the mail address of the user.

On the screen shown in FIG. 4, when the user operates the pointing device or the like so as to press a next button 404, the screen displayed on the display unit 101j shifts from the screen shown in FIG. 4 to the screen shown in FIG. 7.

FIG. 6 shows an example of mail notified by the network communication unit 101a shown in FIG. 1A. The present example is an example of mail in a case where a notification is made to the user who used destination information that has been deleted from the database 101s in the past. The format of content to be notified, a notification method, and the like may be adopted on the basis of the system environment, and are not limited to the present embodiment. Therefore, when making a notification, the content may be encrypted and notified.

In FIG. 6, the present notification mail contains content in which the deleted target device, the deleted destination information, the adding-up period which led to the deletion, the use record during that period, and the like are described. In addition, information other than the above may be notified in combination. Furthermore, the content of notification mail may be changed differently between a case in which all the above information are notified and a case in which partial information is notified according to the attributes of the user to be notified, for example, the user right.

FIG. 7 shows an example of a user interface in the device management system according to the present embodiment. The present example is an example of an added-up result specification screen displayed on the display unit 101j of the device management server 101 when a management user specifies the added-up result used as the updating reference of the destination table. In the present embodiment, as the destination table updating condition, the adding-up period and the adding-up unit can be specified by the manager in accordance with the management and operation of the device management system of the user. Therefore, it is possible for the manager to specify the adding-up unit as the device and the device group, or as the user and the management code. Here, the management code refers to information belonging to the work of the device like the charging target.

In FIG. 7, a novel added-up result creation unit 701 is used to specify a new creation of an added-up result used as an updating reference.

An adding-up start day specification unit 701a is used to specify the start day of an adding-up period. An adding-up period specification unit 701b is used to specify the period starting from the adding-up start day adding up should be performed. In FIG. 7, the period is made selectable as appropriate using the drop-down menu. As described above, since the adding-up period can be freely set, the destination table can be updated every year in the annual use record, and the destination table can be updated every day in the daily use record. As a consequence, it is possible to set a suitable adding-up period according to the environment of the user. That is, it is possible for the manager to specify the period for adding up like one month, one week, one day, in the morning, or the like. Also, it is possible to specify, for each device, the unit for adding up like a group, for example, Building A or shops in a particular area.

An adding-up unit specification unit 701c is used to set an adding-up unit.

An adding-up device selector 701d is used to select a device for which adding up is performed. In the present embodiment, the adding-up device selector 701d is operated in synchronization with the adding-up unit specification unit 701c. The present screen is a screen when a device is selected by the adding-up unit specification unit 701c. A plurality of adding-up devices can also be selected, and the use record of a plurality of devices can also be used as an updating reference.

Furthermore, a device different from the updating target device can also be selected. As a result, for example, when a device is replaced, the destination table of the device after replacement can be updated on the basis of the use record of the device that has been used until now.

An existing added-up result specification unit 702 is used to specify the added-up result created in the past rather than newly creating the updating target added-up result. Here, if the existing added-up result is specified, it is possible to shorten the processing time period of the adding-up processor 101c that newly creates an added-up result.

Even in a configuration where the adding-up processor 101c is distributed to another server, it becomes possible to update the destination table by importing added-up result data.

Figure 8:
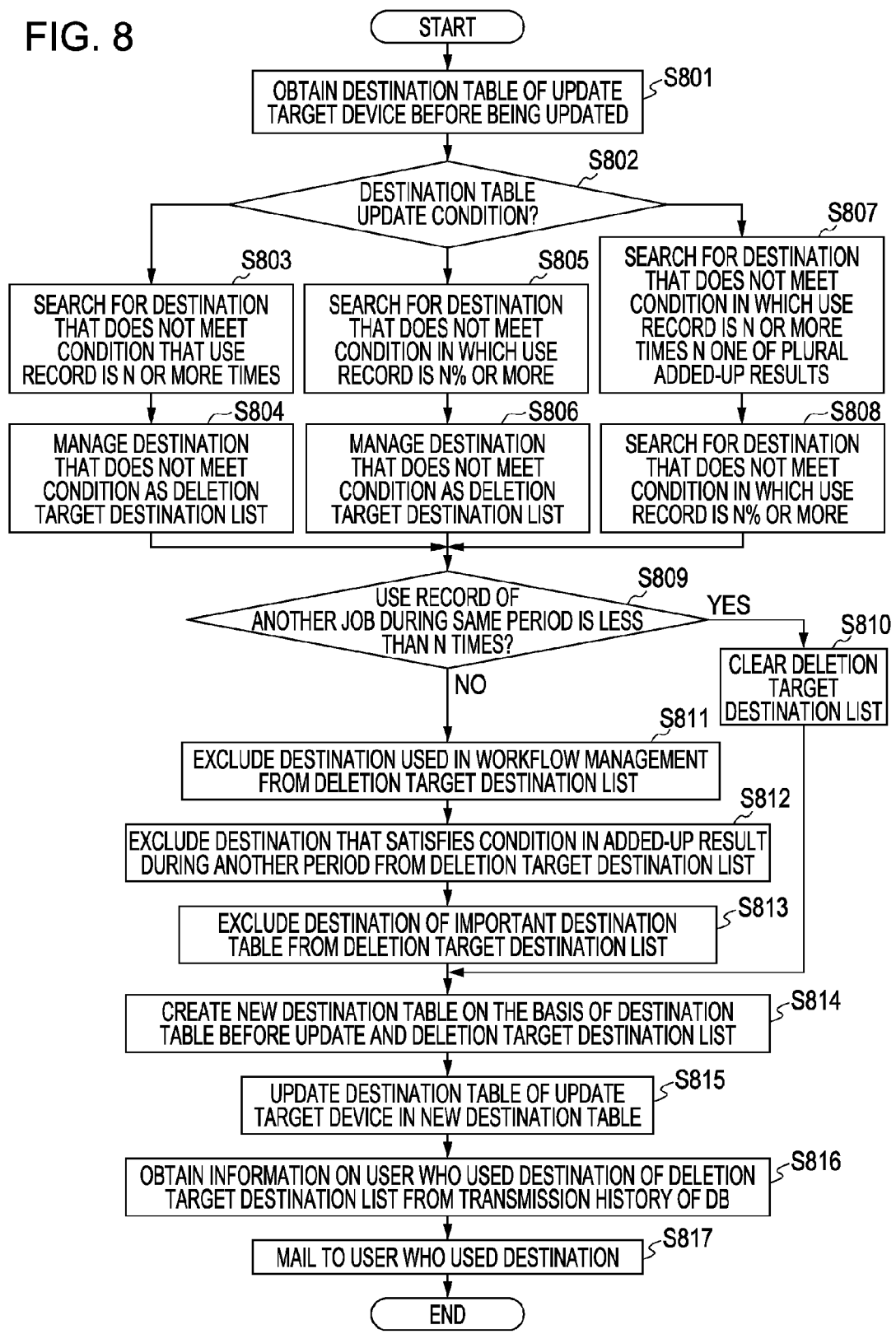
FIG. 8 is a flowchart showing an example of a data processing procedure in a management apparatus according to the present embodiment.

On the screen shown in FIG. 7, when the user operates the pointing device so as to press an execution button 703, the destination table management unit 101d performs, in accordance with the conditions selected using the user interface shown in FIGS. 3, 4 and 7, a destination table updating process in accordance with the procedure of a flowchart shown in FIG. 8.

FIG. 8 is a flowchart showing an example of a data processing procedure in the management apparatus according to the present embodiment. The present example is an example of processing in a case where the device management server 101 shown in FIG. 1A updates a destination table on the basis of an added-up result. S801 to S817 show each step. Each step is implemented by executing a module shown in FIG. 1A by the CPU 10 of the device management server 101. A description will be given below of processing performed by the destination table management unit 101d shown in FIG. 1A, and the like.

Initially, in S801, the destination table management unit 101d obtains the destination table information of an updating target device before updating. Here, the destination table may be obtained from the database 101s of the device management server 101 or from the device for the object of an update via the network 105. In the case that the obtaining destination is the database 101s, destination table information 101m is obtained.

Next, in S802, the destination table management unit 101d makes a determination as to the type of the destination table updating condition selected by the management user. At this point, in a case where the destination table management unit 101d determines that the destination table updating condition is "The use record of the added-up result is N or more times" in the updating condition setting unit 401 shown in FIG. 4, in S803, the destination table management unit 101d searches for a destination that does not meet the specification condition that the numerical value of the use record, which is selected by the updating condition setting unit 401 shown in FIG. 4, is N or more times. Then, in S804, destinations that do not meet the specification condition specified in FIG. 4 are managed as a deletion target destination list in the memory or in the database 101s. Thereafter, the process proceeds to S809. As a result, a destination serving as a deletion candidate is determined. "The use record is N or more times" corresponds to that the use record is a threshold value (N) or more.

On the other hand, in a case where the destination table management unit 101d determines in S802 that the destination table updating condition is "The use record is N % or more", in S805, the destination table management unit 101d searches for a destination that does not meet the specification condition that the numerical value of the use record, which is selected by the updating condition setting unit 401 shown in FIG. 4, is N % or more.

Then, in S806, the destinations that do not meet the condition are managed as a deletion target destination list in the database 101s in the same manner as in S804. Thereafter, the process proceeds to S809. As described above, in the present embodiment, the destination table management unit 101d does not immediately delete the destinations that are determined to be deletion candidates, and temporarily registers them as deletion candidates in the form of a deletion target destination list in the database 101s. Then, the destination is deleted from the deletion target destination list in accordance with the condition under which the destination is excluded in a step (to be described later).

In the case that the destination table management unit 101d determines in S802 that the destination table updating condition is "The use record of plural added-up results is N or more times", in S807, the destination table management unit 101d searches for a destination that does not meet the specification condition that the numerical value of the use record of plural added-up results, which is selected by the updating condition setting unit 401 shown in FIG. 4, is N or more times. Then, in S808, the destinations that do not meet the condition are managed as a deletion target destination list in the database 101s in the same manner as in S804. Thereafter, the process proceeds to S809.

Next, in S809 to S813, a process is performed for excluding, from the updating target, the destination information that meets the exception condition selected by the exception condition setting unit 402 shown in FIG. 4. In S809 to S813, in a case where an exception condition is not selected by the manager in the exception condition setting unit 402 shown in FIG. 4, the steps are skipped.

In S809, the destination table management unit 101d makes a determination as to whether "The use record of another job during the same period is less than N times?" in the exception condition setting unit 402 shown in FIG. 4. When the destination table management unit 101d determines that the condition is met (YES in step S809), the process proceeds to S810. Then, when it is determined that the use record is less than the threshold value, in S810, the deletion target destination list described above, which is managed in the processes of S804, S806, and S808, is entirely cleared by the destination table management unit 101d. The process then proceeds to S814. As described above, in the present embodiment, a process is performed for excluding a destination for the object of deletion from the deletion target on the basis of the number of times operations have been performed by the image forming device in the specified period. Here, the number of operations corresponds to the number of print processes, the number of copy processes, or the number of times in which the number of print processes and the number of copy processes are totaled, which are described above.

On the other hand, the destination table management unit 101d makes a determination in S809 as to whether "The use record of another job during the same period is less than N times?" in the exception condition setting unit 402 shown in FIG. 4. When the destination table management unit 101d determines that the condition is not met (NO in step S809), that is, the use record is determined to be the threshold value or higher, the process proceeds to S811.

Then, in S811, the destination table management unit 101d excludes "the destination information used by another application like workflow management" managed by the workflow management unit 101i from the above-described deletion target destination list managed in the database 101s. That is, in S811, by excluding the destination used by another application that uses an address book from the deletion candidate by using the workflow function, the destination is deleted, thereby making it possible to prevent a failure from occurring in a data transmission process performed by the other application.

Next, in S812, the destination table management unit 101d excludes, from the above deletion target destination list managed in the database 101s, "The destination information that satisfies the updating condition in the added-up result during another period from the deletion target destination list" selected by the exception condition setting unit 402 shown in FIG. 4.

Then, in S813, the destination table management unit 101d excludes, from the above deletion target destination list managed in the database 101s, "The destination information set in the important destination table" selected by the exception condition setting unit 402 shown in FIG. 4. Here, the sequential order of the exception condition processes (S809 to S813) may be any sequential order.

Next, in S814, the destination table management unit 101d creates a new destination table after updating from the destination table before updating in S801 and from the deletion target destination list created in S809 to S813. Then, in S815, the destination table management unit 101d updates the destination table of the updating target device. Here, examples of updating methods include a method of updating the destination table information 101m of the device management server 101, a method of distributing to the updating target device in the destination table distribution unit 101e of the device management server 101, and a method of outputting in a file format readable by the updating target device.

Then, in S816, the destination table management unit 101d obtains information on the user who used the destination information of the deletion target destination list in the past from the transmission history 101k of the database 101s of the device management server 101. Then, in S817, the destination table management unit 101d notifies these users who are identified from the obtained user information of mail (FIG. 6) that the destination information has been deleted, and thus this processing is completed.

As a result, it is possible to update the destination table on the basis of the destination table updating conditions shown in FIG. 4 and the exception conditions. By updating the destination table in adaptation to the environment of the user, it is possible to prevent the destination table from increasing in size and possible to effectively utilize the memory resources.

In the above-described embodiment, a case has been described in which the device management server 101 functioning as the management apparatus communicates with the image forming device via a network and collects the use record of processes of the image forming device. The management apparatus may be provided in the image forming device. In this case, the image forming device can be realized by executing a module corresponding to the function of the device management server described in the first embodiment.

Furthermore, a specific image forming device among a plurality of image forming devices connected on the network may be made to perform the functions of the device management server, so that all the image forming devices do not have the functions of the device management server. In this case, the image forming device having the function of the device management server may be provided with a storage device, such as a hard disk, as means that is made to function as the database 101s shown in FIG. 1A.

Referring to a memory map shown in FIG. 9, a description will be given below of the structure of a data processing program that can be read by the management apparatus according to the present invention.

FIG. 9 illustrates a memory map of a computer-readable storage medium storing various kinds of data processing programs that can be read by the management apparatus according to the present invention.

Although not particularly shown in the figure, there is a case in which information for managing a group of programs stored on the computer-readable storage medium, for example, version information, the creator, and the like, and information subordinate to the OS on the program reading side, for example, icons for identifiably displaying programs, and the like, is stored.

Furthermore, data subordinate to various kinds of programs is managed in a directory. In a case in which a program for installing various kinds of programs into a computer and programs to be installed are compressed, for example, a program for decompressing the programs may be stored.

The functions shown in FIG. 8 in the present embodiment may be performed by a host computer in accordance with a program that is externally installed. In that case, the present invention is also applicable to a case in which an information group including a program is supplied to an output device from a computer-readable storage medium, such as a CD-ROM, a flash memory, or an FD, or from an external computer-readable storage medium via a network.

In the manner described above, a computer-readable storage medium on which program code of software that implements the functions of the above-described embodiments is recorded is supplied to a system or an apparatus. The program code stored on the computer-readable storage medium is read and executed by a computer (CPU or MPU) of the system or the apparatus, thereby achieving the object of the present invention.

In this case, the program code itself read from the computer-readable storage medium implements the novel functions of the present invention, and the computer-readable storage medium storing the program code constitutes the present invention.

Therefore, the form of the program, such as object code, a program that is executed by an interpreter, scrip data supplied to an OS, does not matter as long as the program has the functions.

Examples of a usable computer-readable storage medium via which a program is supplied include a flexible disc, a hard disk, an optical disc, a magneto-optical disc, an MO, a CD-ROM, a CD-R, a CD-RW, a magnetic tape, a non-volatile memory card, a ROM, and a DVD.

In such a case, the program code itself read from the computer-readable storage medium implements the functions of the above-described embodiments and constitutes the present invention.

In addition, a program can be supplied in such a way that connection is made to a home page of the Internet by using the browser of a client computer, and a computer program of the present invention or a compressed file having an automatic installable function is downloaded into a recording medium, such as a hard disk. Alternatively, program code forming the program of the present invention may be divided into a plurality of files, and the respective files may be downloaded from different home pages. That is, a WWW server and a FTP (File Transfer Protocol) server through which a program file that implements the function processes of the present invention by a computer are downloaded into a plurality of users fall under the scope of the present invention.

Furthermore, a program according to the present invention is encrypted, is stored on a computer-readable storage medium such as a CD-ROM, and is distributed to a user. The user who clears predetermined conditions is made to download key information for decrypting encryption from a home page via the Internet. Then, by using the key information, the encrypted program is executed and installed into the computer.

A computer may execute a read program to implement the functions of the foregoing embodiments. In addition, an OS (Operating System) or the like running on a computer may execute part of or the entirety of actual processing according to the instructions of the program code to implement the functions of the foregoing embodiments.

Furthermore, program code read from a computer-readable storage medium is written in a memory provided in a function expansion board inserted into a computer or in a function expansion unit connected to a computer. Thereafter, a CPU or the like provided in the function expansion board or in the function expansion unit may execute part of or the entirety of actual processing to implement the functions of the foregoing embodiments.

The present invention is not limited to the foregoing embodiments, but can be modified in various manners (including an organic combination of embodiments) within the the gist and scope of the present invention. Such modifications also fall within the scope of the present invention.

Various examples and embodiments of the present invention have been described. For a person skilled in the art, the gist and scope of the present invention are not limited to the specific descriptions of this specification.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-123284 filed May 9, 2008, which is hereby incorporated by reference herein in its entirety.

What is claimed is:

1. A management apparatus for managing destination information stored in an image forming device, the management apparatus comprising at least a computer processor that functions as:
   a determination unit configured to determine destination information of a deletion candidate on the basis of a use record of the destination information stored in the image forming device for a predetermined period;
   a display unit configured to control to display a setting screen for setting a plurality of exceptional conditions for deleting the destination information and for setting a notification setting for notifying that the destination information has been deleted;
   a deletion unit configured not to delete the destination information when a number of times an operation has been performed by the image forming device for a predetermined period is less than a threshold value and configured to automatically delete the destination information of the deletion candidate determined by the determination unit when the number of times the operation has been performed by the image forming device for the predetermined period is greater than or equal to the threshold value; and
   a notification unit configured to notify, according to the notification setting set via the displayed setting screen, a user who used the destination information deleted by the deletion unit that the destination information has been deleted,
   wherein the deletion unit does not delete the destination information of the deletion candidate determined by the determination unit when the destination information has been used, as a destination of data, by a workflow function registered in the image forming device, even if the number of times the operation has been performed by the image forming device for the predetermined period is greater than or equal to the threshold value, in a case where deletion of destination information being used by the workflow function is one of the exceptional conditions set via the displayed setting screen.

2. The management apparatus according to claim 1, wherein the number of times the operation has been performed by the image forming device indicates a number of print processes, a number of copy processes, or a total number of print processes and copy processes.

3. The management apparatus according to claim 1, wherein the management apparatus is connected to the image forming device via a network, and collects the use record of processes in the image forming device, thereby managing the destination information.

4. A management method performed using a computer processor of a management apparatus for managing destination information stored in an image forming device, the management method comprising:
   determining the destination information of a deletion candidate on the basis of a use record of the destination information stored in the image forming device for a predetermined period;
   controlling to display a setting screen for setting a plurality of exceptional conditions for deleting the destination information and for setting a notification setting for notifying that the destination information has been deleted;
   automatically deleting the destination information when a number of times an operation has been performed by the image forming device for a predetermined period is greater than or equal to a threshold value, and wherein the destination information is not deleted when the number of times the operation has been performed by the image forming device for the predetermined period is less than the threshold value;
   notifying, according to the notification setting set via the displayed setting screen, a user who used the deleted destination information that the destination information has been deleted; and
   not deleting the destination information of the deletion candidate when the destination information has been used, as a destination of data, by a workflow function registered in the image forming device, even if the number of times the operation has been performed by the image forming device for the predetermined period is greater than or equal to the threshold value, in a case where deletion of destination information being used by the workflow function is one of the exceptional conditions set via the displayed setting screen.

5. The management method according to claim 4, wherein the number of times the operation has been performed by the image forming device indicates a number of print processes, a number of copy processes, or a total number of print processes and copy processes.

6. The management method according to claim 4, wherein the management apparatus is connected to the image forming device via a network, and collects the use record of processes in the image forming device, thereby managing the destination information.

7. A non-transitory computer-readable storage medium having stored thereon a computer-executable program for performing a management method for managing destination information stored in an image forming device, the management method comprising:
   determining the destination information of a deletion candidate on the basis of a use record of the destination information stored in the image forming device for a predetermined period;

controlling to display a setting screen for setting a plurality of exceptional conditions for deleting the destination information and for setting a notification setting for notifying that the destination information has been deleted;

automatically deleting the destination information when a number of times an operation has been performed by the image forming device for a predetermined period is greater than or equal to a threshold value, and wherein the destination information is not deleted when the number of times the operation has been performed by the image forming device for the predetermined period is less than the threshold value;

notifying, according to the notification setting set via the displayed setting screen, a user who used the deleted destination information that the destination information has been deleted; and not deleting the destination information of the deletion candidate when the destination information has been used, as a destination of data, by a workflow function registered in the image forming device, even if the number of times the operation has been performed by the image forming device for the predetermined period is greater than or equal to the threshold value, in a case where deletion of destination information being used by the workflow function is one of the exceptional conditions set via the displayed setting screen.

8. The management apparatus according to claim 1, wherein the destination information includes at least one facsimile number, email address, or address of a client.

9. The management apparatus according to claim 1, further comprising a management unit configured to notify a user by a message the deleted destination information.

* * * * *